(12) United States Patent
Muratov

(10) Patent No.: US 9,030,051 B2
(45) Date of Patent: May 12, 2015

(54) WIRELESS POWER TRANSMISSION WITH IMPROVED MODULATION RIPPLE

(75) Inventor: Vladimir A. Muratov, Manchester, NH (US)

(73) Assignee: Texas Instruments Incorporated, Dallas, TX (US)

( * ) Notice: Subject to any disclaimer, the term of this patent is extended or adjusted under 35 U.S.C. 154(b) by 616 days.

(21) Appl. No.: 13/324,348

(22) Filed: Dec. 13, 2011

(65) Prior Publication Data

US 2013/0147279 A1    Jun. 13, 2013

(51) Int. Cl.
| | | |
|---|---|---|
| H02J 17/00 | (2006.01) | |
| H02J 7/02 | (2006.01) | |
| H02J 5/00 | (2006.01) | |
| H04B 5/00 | (2006.01) | |

(52) U.S. Cl.
CPC ............... *H02J 7/025* (2013.01); *H04B 5/0037* (2013.01); *H02J 5/005* (2013.01); *H04B 5/0081* (2013.01)

(58) Field of Classification Search
None
See application file for complete search history.

(56) References Cited

U.S. PATENT DOCUMENTS

| | | | |
|---|---|---|---|
| 7,421,249 B2 * | 9/2008 | Ariyoshi et al. | ............ 455/67.13 |
| 8,111,140 B2 * | 2/2012 | Rizzo et al. | ................... 340/10.4 |
| 2008/0180224 A1 * | 7/2008 | Klapf et al. | ................... 340/10.4 |
| 2010/0264746 A1 | 10/2010 | Kazama et al. | |
| 2011/0260548 A1 * | 10/2011 | Urano | ........................... 307/104 |

FOREIGN PATENT DOCUMENTS

| | | |
|---|---|---|
| KR | 1020110106456 | 9/2011 |
| KR | 1020110110525 | 10/2011 |
| KR | 1020110110987 | 10/2011 |
| KR | 1020110112435 | 10/2011 |

OTHER PUBLICATIONS

C. Jamerson, D. Y. Chen. "Techniques for reduction of required headroom in high-frequency magamp postregulators", IEEE Transactions of Power Electronics, vol. 8, No. 1, Jan. 1993.*
Integrated Wireless Power Supply Receiver, Qi (Wireless Power Consortium) Compliant; bq51010, bq51011, bq51013; SLVSAT9A—Apr. 2011—Revised May 2011; p. 1-29; Texas Instruments Incorporated; Dallas, Texas, USA.
Qi Compliant Wireless Power Transmitter Manager; bq500110; SLUSAE0A—Nov. 2010—Revised Apr. 2011; p. 1-25; Texas Instruments Incorporated; Dallas, Texas, USA.

(Continued)

*Primary Examiner* — Jared Fureman
*Assistant Examiner* — David Shiao
(74) *Attorney, Agent, or Firm* — William B. Kempler; Frank D. Cimino

(57) ABSTRACT

A wireless power receiver receives electrical power via electromagnetic field coupling from a wireless power transmitter. During communication time periods, the power receiver alters the electromagnetic field in a manner that the power transmitter can detect as a string of logic bits in a communication bit stream for sending data to the power transmitter. During pause time periods when data is not being sent to the power transmitter, the power receiver alters the electromagnetic field in a manner that the power transmitter does not detect as a string of logic bits (e.g. at a rate outside a communication frequency band). In some embodiments, a ripple is reduced in a voltage produced by the wireless power receiver from the electromagnetic field during the communication and pause time periods.

17 Claims, 7 Drawing Sheets

(56) References Cited

OTHER PUBLICATIONS

Bill Johns; An introduction to the Wireless Power Consortium standard and TI's compliant solutions; Power Management; High-Performance Analog Products; Analog Applications Journal; 1Q 2011; p. 10-12; Texas Instruments Incorporated; Dallas, Texas, USA.

System Description; Wireless Power Transfer; vol. I: Low Power; Part 1: Interface Definition; Version 1.0.2; Apr. 2011; p. 1-60; Wireless Power Consortium.

PCT Search Report mailed Mar. 28, 2013.

* cited by examiner

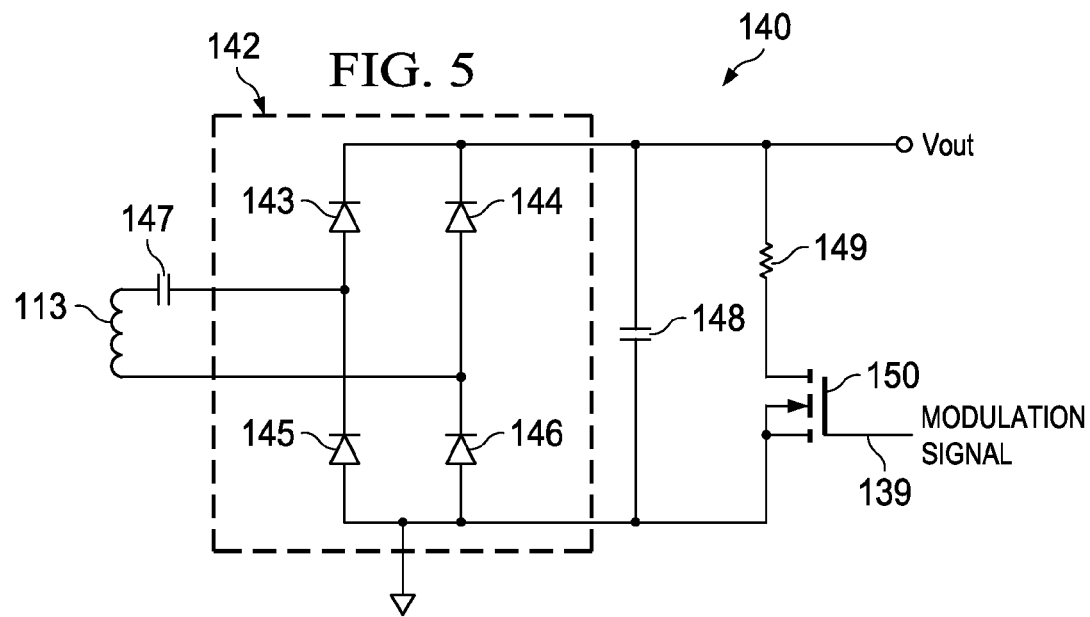
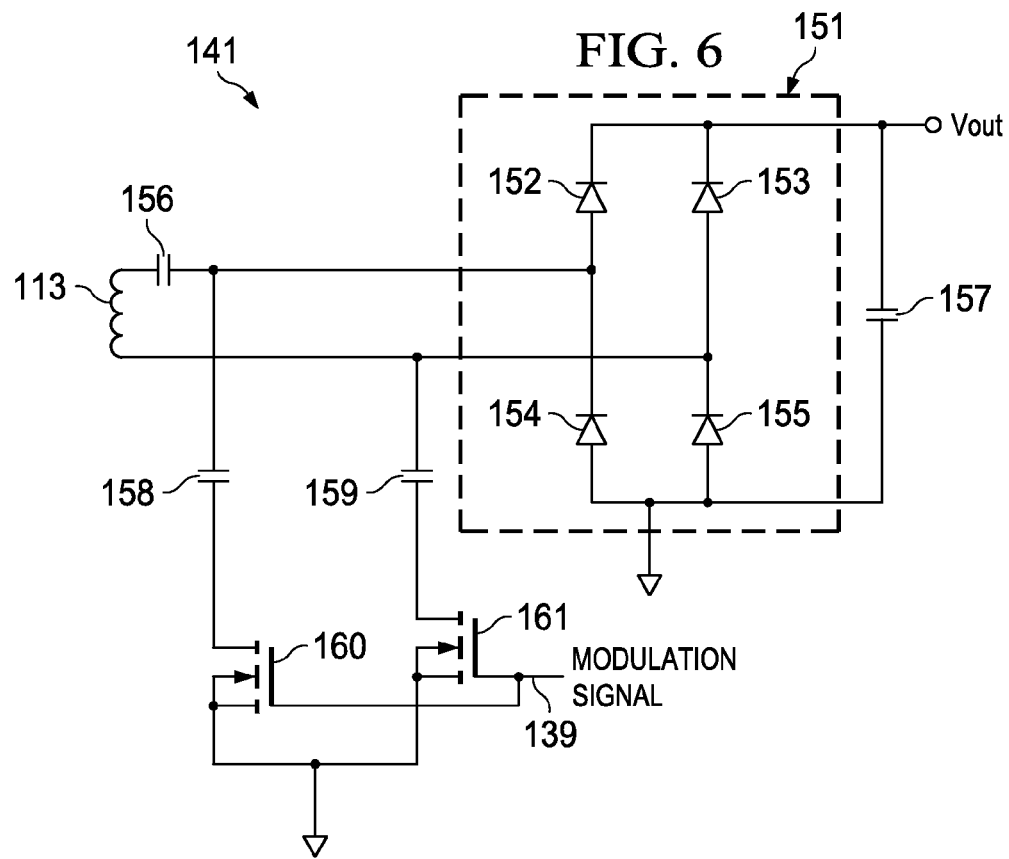

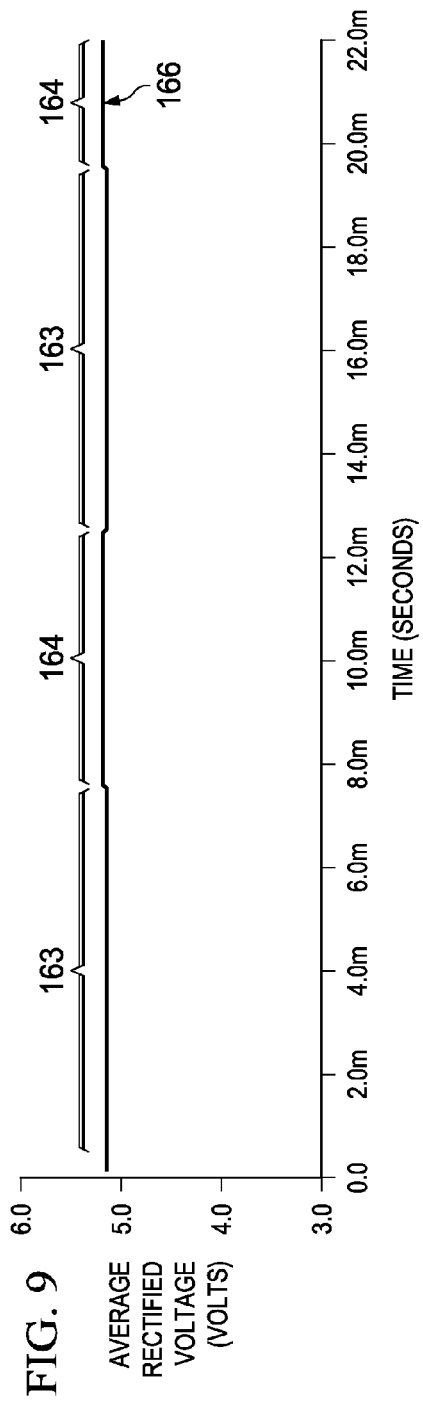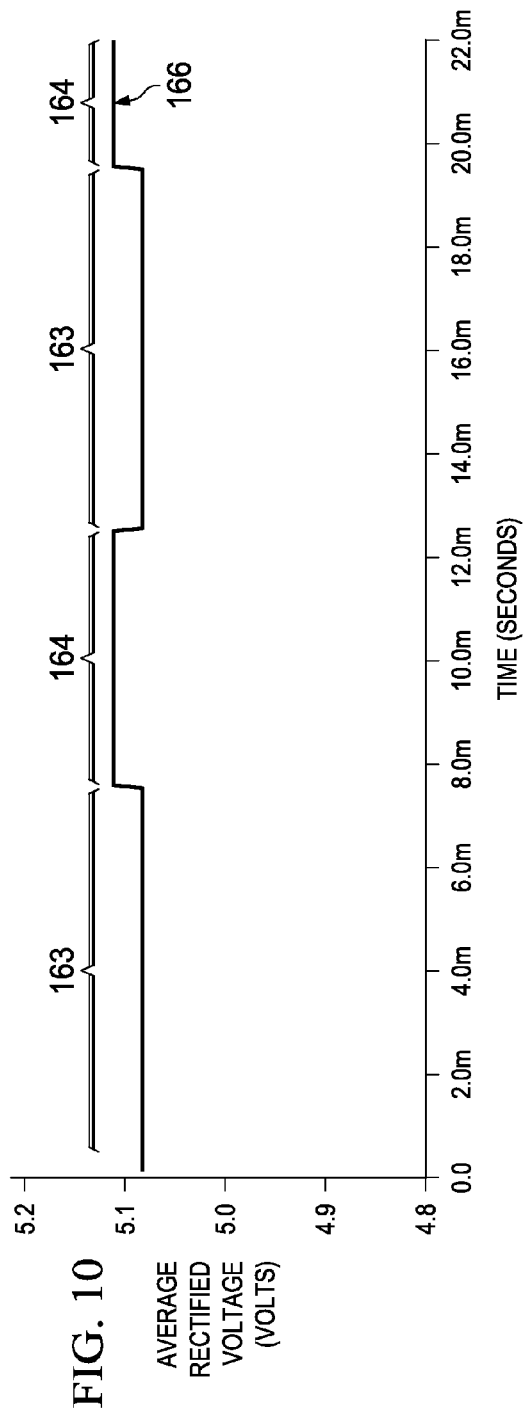

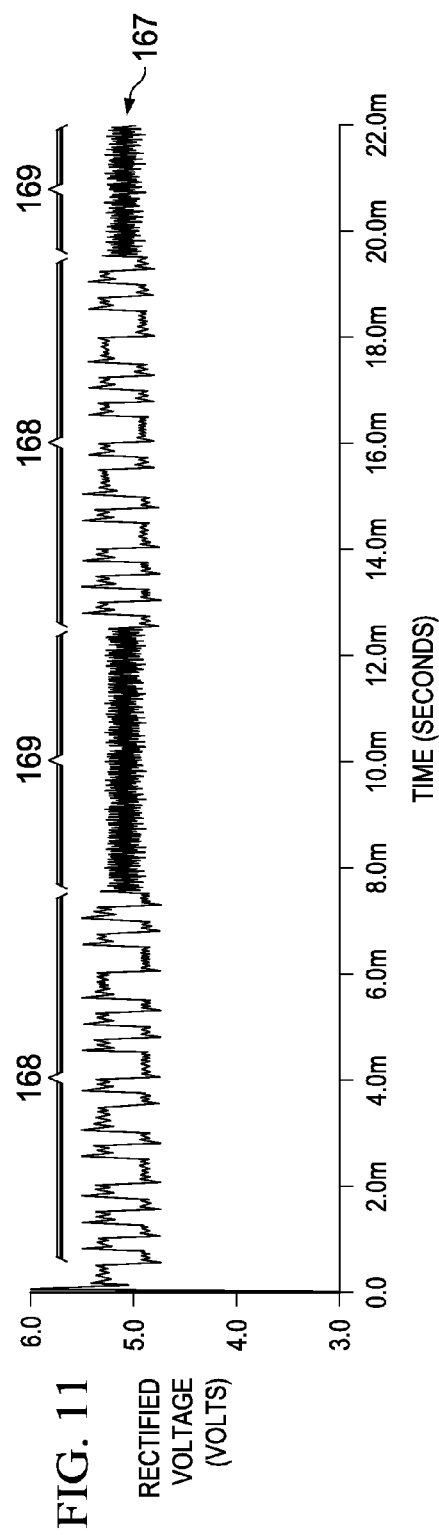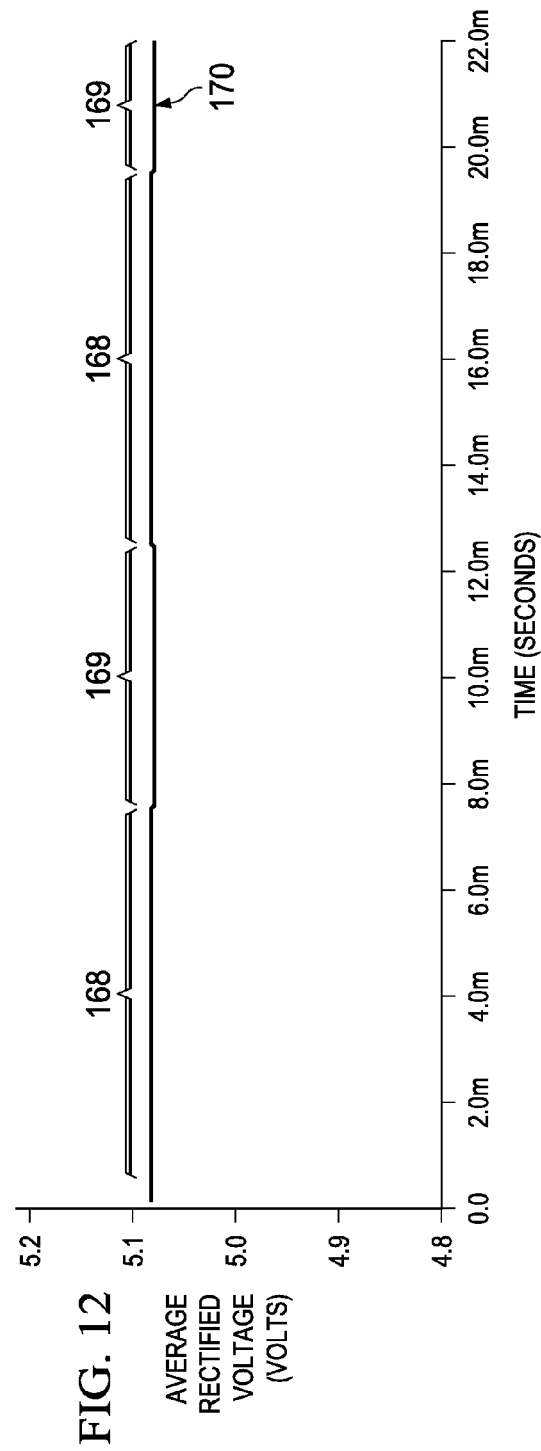

WIRELESS POWER TRANSMISSION WITH IMPROVED MODULATION RIPPLE

BACKGROUND OF THE INVENTION

Wireless power transfer is generally achieved by electromagnetic field coupling between a power transmitter and a power receiver. A primary electromagnetic field coupling component in the power transmitter generates an electromagnetic field that is picked up by a secondary electromagnetic field coupling component in the power receiver when the power receiver is placed near the power transmitter. The overall power receiving device (containing the power receiver) rectifies, conditions and/or regulates the received power as needed for the functioning of the device.

This power transfer technique is widely used in many electrical devices (typically, but not exclusively, mobile or handheld devices, e.g. cell phones, electric toothbrushes, etc.) for a variety of purposes (e.g. to safely isolate the transmitter from the receiver, to recharge batteries encased within a watertight housing, etc.). The Qi Low Power Specification (System Description, Wireless Power Transfer, Volume I: Low Power, Part 1: Interface Definition, Version 1.0.2, April 2011) of the Wireless Power Consortium (the WPC standard) is an industry standard that sets forth a suitable description for implementing a wireless power transfer system (wireless power transmitter and wireless power receiver) and is incorporated herein by reference. Additionally, the Qi Compliant Wireless Power Transmitter Manager bq500110 data sheet (November 2010—Revised April 2011) and the Integrated Wireless Power Supply Receiver, Qi (Wireless Power Consortium) Compliant bq51010, bq51011 and bq51013 data sheet (April 2011—Revised May 2011), both by Texas Instruments Incorporated, are specific examples of a wireless power transmitter and wireless power receiver, respectively, and are incorporated herein by reference. (Where a definition or use of a term in an incorporated reference is inconsistent or contrary to the definition of that term provided herein, the definition of that term provided herein applies and the definition of that term in the reference does not apply.)

In a typical wireless power transfer system design (including that of the WPC standard) the power transmitter generates an electromagnetic field through a primary inductor coil. In a power pick-up unit with the overall power receiving device, a secondary inductor coil generates an AC current and voltage from the electromagnetic field. A rectification circuit rectifies the AC current and voltage to a DC current and voltage. A voltage regulator (or an output disconnect or a voltage conditioner, herein referred to as the voltage regulator) regulates the rectified voltage to a relatively constant or stable output voltage that can be used by the overall power receiving device to charge a battery or power its primary function circuitry.

When the power receiver (or just the secondary inductor coil) is within the electromagnetic field generated by the power transmitter, the secondary coil affects the electromagnetic field according to its resonant frequency and, thereby, changes the current through the primary inductor coil. This change in current can be used by the power transmitter to detect a load due to the presence of the power receiver and to receive communications from the power receiver. Controlling the amount of power wirelessly transferred from the power transmitter to the power receiver is thus achieved by sending feedback or error-signal communications from the power receiver to the power transmitter (e.g. to increase or decrease the transmitted power) by means of varying the resonant frequency of the secondary coil and, thus, the effect of the secondary coil on the electromagnetic field. For example, the power receiver may periodically communicate its operating voltage, current and power levels or send commands for corrective actions required from the power transmitter to keep power receiver parameters within desired operating ranges. The power receiver typically communicates these signals, data or commands by modulating the load seen by the power transmitter with a differential bi-phase encoding scheme. The power receiver usually performs this modulation by switching on and off a modulation component (e.g. one or more capacitor, resistor or other dissipative component) that is typically placed before or after the rectification circuit in the power pick-up unit. The switching on and off of the modulation component generally changes the voltage level of the rectified voltage output by the rectification circuit and alters the resonant frequency in the secondary inductor coil. In this manner, the power receiver alters the coupling electromagnetic field between two states that the power transmitter can detect as logic bits in a data bit stream.

In order to explain problems associated therewith, an example of the communication technique is illustrated by a set of graphs shown in FIGS. 1, 2 and 3 as generated by a simulation of a typical prior art wireless power receiver as it communicates generic data or commands to a power transmitter. In this example, two sets of logic bits 100 and 101 (FIG. 1) are transmitted in a bit stream by the power receiver. The sets of logic bits 100 and 101 are encoded into a corresponding bit stream waveform 102 using a differential bi-phase encoding scheme. A fixed set of initial pulses 103 is added to the front of the logic bits 100 and 101 to form a modulation signal 104 that is used to modulate the load (i.e. switch on and off the modulation component) in the power receiver. The power transmitter, thus, senses a series of changes in the coupling electromagnetic field that correspond to the modulation signal 104. When the power transmitter detects the initial pulses 103, it can proceed to properly decode the logic bits 100 or 101 that follow.

FIG. 2 shows a simulated graph 105 of an example rectified voltage generated by the rectification circuit as the modulation component is switched on and off according to the modulation signal 104. During communication time periods 106 (when the logic bits 100 and 101 are being transmitted, typically a few tens of milliseconds), the rectified voltage changes between high and low levels representative of the modulation signal 104 with the encoded bit stream. During pause time periods 107 (when data is not being transmitted and the electromagnetic field is not being altered, typically a few hundreds of milliseconds), the rectified voltage remains at the high level (caused by the modulation component remaining switched off). (An alternative prior art graph could be generated by maintaining the modulation component switched on; in which case, the rectified voltage would remain at the low level during the pause time periods 107.)

Throughout the rectified voltage graph 105, the rectified voltage ripples around the nominal high and low levels. Post-rectification filtering, conditioning and/or regulating generally smooth out the ripples. However, when the average of the rectified voltage (as shown by graph 108, FIG. 3) during the communication time periods 106 is substantially different from the average during the pause time periods, a regulation error typically occurs. The regulation error generally manifests itself as a periodically occurring output voltage ripple and disturbance to the feedback loop.

To compensate for this error, filtering capacitors on the rectification circuit output have to be relatively large due to the relatively large difference in average voltage over the relatively long duration of a cycle of the communication and pause time periods. Additionally, the post-rectification voltage regulator has to operate at a relatively high headroom voltage due to the relatively large difference in average voltage. These compensating measures contribute negatively to the efficiency, form factor and cost of the overall power receiving device. The large filtering capacitors, for example, can take up significant space, which is usually at a premium in a handheld device. Also, the operation of the voltage regulator at the high headroom results in a loss of efficiency, which is highly significant in battery-powered devices.

It is with respect to these and other background considerations that the present invention has evolved.

SUMMARY OF THE INVENTION

Embodiments of the present invention generally involve a wireless power receiving device altering the electromagnetic field (e.g. between first and second states) in a manner that the wireless power transmitter can detect as a string of logic bits during communication time periods. However, unlike in the above described prior art, the wireless power receiver also alters the electromagnetic field (e.g. between, or within a range between, the first and second states) during intervening pause time periods, but in a manner that the wireless power transmitter cannot detect as a string of logic bits.

In more specific embodiments, the rectified voltage in the power receiver is modulated during communication time periods at a frequency that allows the power transmitter to detect the resulting alterations in the electromagnetic field as communication logic bits. However, during the pause time periods, the rectified voltage is modulated at a different frequency that is too high for the power transmitter to detect the resulting alterations in the electromagnetic field as communication logic bits. Additionally, according to some embodiments, the modulating at the higher frequency results in an average rectified voltage for the pause time periods being substantially similar to the average rectified voltage for the communication time periods, thereby allowing for maximizing the efficiency of the voltage regulator. Furthermore, according to additional embodiments, a duty cycle of the higher frequency modulation is preferably selected to control the average rectified voltage level to better maximize the efficiency of the voltage regulator.

A more complete appreciation of the present disclosure and its scope, and the manner in which it achieves the above noted improvements, can be obtained by reference to the following detailed description of presently preferred embodiments taken in connection with the accompanying drawings, which are briefly summarized below, and the appended claims.

BRIEF DESCRIPTION OF THE DRAWINGS

FIG. 5 is a simplified schematic diagram of a portion of a power pick-up unit in a wireless power receiving device incorporating an embodiment of the present invention.

FIG. 6 is an alternative simplified schematic diagram of a portion of a power pick-up unit in a wireless power receiving device incorporating an embodiment of the present invention.

FIG. 9 is a simplified graph of an average of the rectified voltage shown in FIG. 8 according to an embodiment of the present invention.

FIG. 10 is the simplified graph of the average rectified voltage shown in FIG. 9, but at a finer y-axis resolution, according to an embodiment of the present invention.

FIG. 11 is a simplified graph of an alternative example rectified voltage resulting from the modulation signal shown in FIG. 7 according to an embodiment of the present invention.

FIG. 12 is a simplified graph of an average of the rectified voltage shown in FIG. 11 according to an embodiment of the present invention.

DETAILED DESCRIPTION OF THE INVENTION

Figure 4:
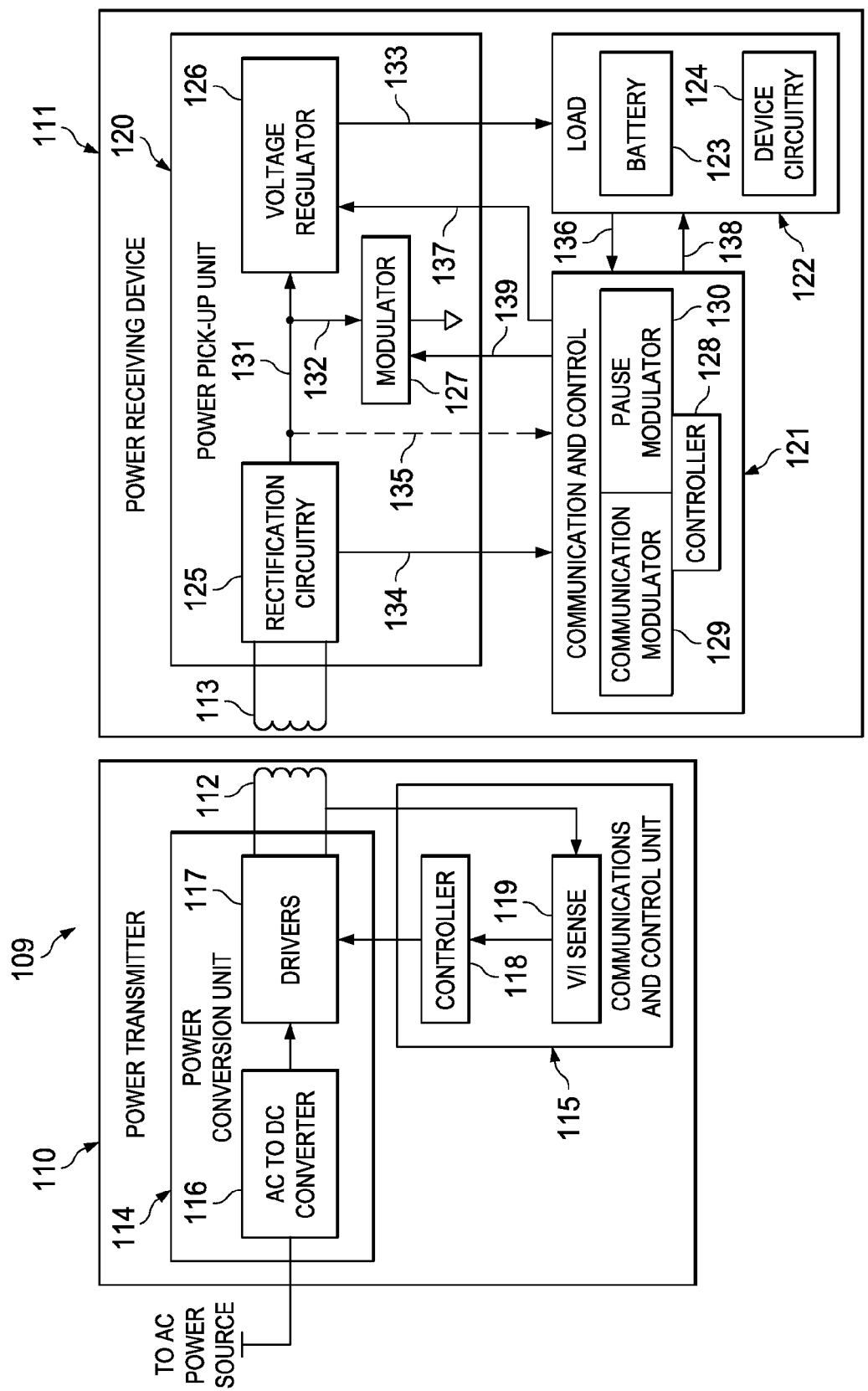
FIG. 4 is a simplified schematic diagram of a wireless power transfer system incorporating an embodiment of the present invention.

An example wireless power transfer system 109 incorporating an embodiment of the present invention is shown in FIG. 4. The wireless power transfer system 109 generally includes a power transmitter 110 and a power receiving device 111. The power receiving device 111 may be any appropriate electronic device, such as a cell phone, game controller, electric toothbrush, clock, computer, microphone, etc. Electrical power is transferred from a primary inductor coil 112 in the power transmitter 110 to a secondary inductor coil 113 in the power receiving device 111 by means of electromagnetic field coupling. During communication time periods, the power receiving device 111 modulates the electromagnetic field between first and second states in a manner that can be detected by the power transmitter 110 as logic bits in a communication bit stream. As described in more detail below, the power receiving device 111 continues to modulate the electromagnetic field between the same states (or within a range that is between the two states) during pause time periods between the communication time periods, but in a manner that cannot be detected by the power transmitter 110 as logic bits. This modulation technique enables advantages described herein, including reducing a ripple in a voltage produced by the wireless power receiver from the electromagnetic field during the communication and pause time periods.

The specific components shown and described for the power transmitter 110 and the power receiving device 111 are presented for illustrative purposes only and not necessarily intended to limit the present invention. Other components, or combinations or configurations thereof, can also be used, while remaining within the scope of the present invention. For example, in other embodiments, the primary and secondary inductor coils (i.e. electromagnetic field coupling components) 112 and 113 could be capacitive devices, instead of inductive devices. Other component variations are possible for other embodiments.

In the illustrated embodiment, in addition to the primary inductor coil 112, the power transmitter 110 generally includes a power conversion unit 114 and a communications and control unit (the control unit) 115. The power conversion unit 114 generally includes an AC to DC converter 116 and one or more power drivers 117. The control unit 115 generally includes a controller (e.g. a microcontroller or CPU) 118 and one or more voltage and current sensors (V/I sense) 119. The power conversion unit 114 generally receives electrical power from an external source, such as an AC power source, and generates a power signal (through the AC to DC converter 116 and drivers 117) that is applied to the primary inductor coil 112 to create the coupling electromagnetic field. The base frequency for the power signal, and the coupling electromagnetic field generated therefrom, is typically in a range of about 100-200 KHz, but frequencies outside this range are known and acceptable in the present invention. The WPC standard, for example, calls for an operational frequency in the 110-205 KHz range. The sensors 119 in the control unit 115 generally detect changes in the coupling electromagnetic field. Such changes may indicate the presence or absence of the power receiving device 111 within the electromagnetic field, as well as communications from the power receiving device 111. Such communications generally arrive in packets, and various types of communication packets may be used. These may include, but are not limited to, identification and authentication packets, error packets, control packets, end power packets, and power usage packets. The controller 118 interprets the communication packets and, in response, determines how to set the level of the power signal produced by the power conversion unit 114. The power receiving device 111 generally maintains full control over the power transfer using the communication packets. The WPC standard and the bq500110 data sheet (mentioned above) describe other acceptable, allowable or optional features for the power transmitter 110.

In the illustrated embodiment, in addition to the secondary inductor coil 113, the power receiving device 111 generally includes a power pick-up unit 120, a communication and control unit 121 and a load 122. The load 122 generally represents a rechargeable battery 123 and/or device circuitry 124 for performing the primary functions of the power receiving device 111. The power pick-up unit 120 generally includes a rectification circuitry 125, a voltage regulator (e.g. a low dropout regulator, a switch mode regulator or other voltage conditioning or output disconnect circuitry) 126 and a modulator 127. The communication and control unit 121 generally includes a controller (e.g. a microcontroller or CPU) 128, a communication modulation signal generator (Comm. Mod.) 129 and a pause period modulation signal generator (Pause Mod.) 130. (The Comm. Mod. 129 and the Pause Mod. 130 generally represent components, some of which may be shared, for generating an appropriate modulation signal by the communication and control unit 121 during the communication time periods and the intervening pause time periods.)

In the illustrated embodiment, the secondary inductor coil 113 generates an AC current and voltage from the coupling electromagnetic field. The AC current and voltage is rectified to a DC current and voltage (e.g. on line 131) by the rectification circuitry 125. The modulator 127 receives a portion of the DC current (e.g. on line 132) in order to modulate the rectified voltage as needed during the communication time periods and the intervening pause time periods. The voltage regulator 126 uses the rectified voltage to generate a substantially constant or stable supply voltage for the load 122 (e.g. on line 133).

In the illustrated embodiment, the rectification circuitry 125 also preferably provides power (e.g. on line 134) to the communication and control unit 121. Additionally, the communication and control unit 121 preferably receives a sense signal (e.g. on dashed line 135) indicative of the voltage and/or current of the rectified voltage on line 131. Furthermore, the communication and control unit 121 preferably receives one or more feedback signal (e.g. on line 136) indicative of the power usage of the load 122 or the state of charge of the battery 123 or other appropriate status data. (The communication and control unit 121 also typically generates control signals on lines 137 and 138 to control the voltage regulator 126 and the load 122, respectively, as necessary.)

Based on the sense signal (line 135) and the feedback signal (line 136), the communication and control unit 121 (e.g. via the controller 128) generally determines the commands and/or data to be transmitted to the power transmitter 110 for the power transmitter 110 to make any needed adjustments to its power output level. Through the Comm. Mod. 129, the communication and control unit 121 periodically generates a differential bi-phase encoded modulation signal representative of the logic bits of the command or data to be transmitted to the power transmitter 110. The differential bi-phase encoded modulation signal is provided to the modulator 127 (e.g. on line 139), so the modulator 127 can modulate the rectified voltage level (line 131) in a manner representative of the logic bits during the communication time periods, so the resulting electromagnetic field alterations occur in a manner that leads to the power transmitter 110 detecting the logic bits. During the pause time periods, however, the communication and control unit 121 (through the Pause Mod. 130) generates a second non-encoded modulation signal, which is provided to the modulator 127 on line 139, so the modulator 127 can modulate the rectified voltage (line 131) to alter the electromagnetic field in a manner that the power transmitter 110 cannot detect as the logic bits.

In some embodiments, the modulation during the pause time periods is preferably substantially more rapid, or at a higher frequency, than the modulation during the communication time periods, but preferably substantially less rapid than the base frequency of the electromagnetic field. Additionally, the modulation frequency is preferably outside the audible range. A factor of five difference from the communication frequency and the base frequency is typically appropriate. The communication frequency for wireless power transmission is commonly within the range of 200 Hz to 10 kHz, and the base frequency is commonly 100-200 kHz. (Communication and base frequencies outside these ranges are also possible.) Therefore, the rapid modulation frequency is preferably in a range of about 1-50 kHz, depending on the communication and base frequencies. For embodiments that incorporate the WPC standard or the bq500110 data sheet or the bq51010, bq51011 and bq51013 data sheet (mentioned above), for example, the communication frequency is about 2 kHz (i.e. the bit rate is about 2 kbps) and the base frequency is about 110-205 kHz. In this case, an appropriate rapid modulation frequency may thus have a lower limit of about 10 kHz (i.e. 5× of 2 kHz) and an upper limit of about 22-41 kHz (i.e. 5× less than 110-205 kHz). Other ranges for the rapid modulation frequency are also possible and generally may depend on the communication and base frequencies. Power transmitters typically filter out frequencies slightly higher than the communication frequency in their control unit (e.g. control unit 115), so the rapid modulation frequency cannot cause such power transmitters to erroneously detect a stream of logic bits in the changes to the electromagnetic field. Other modulation techniques that cannot result in the power transmitter 110 erroneously detecting logic bits during pause time periods are also within the scope of the present invention.

In some embodiments, the design of the power pick-up unit 120 preferably coordinates the rectified voltage level (line 131) and the modulation thereof with the headroom necessary for efficient operation of the voltage regulator 126. As described in more detail below, the modulation of the rectified voltage during the pause time periods is preferably performed in a manner such that the average of the rectified voltage level during these time periods is about the same as the average of the rectified voltage level during the communication time periods. The headroom available for the voltage regulator 126 is, thus, relatively constant throughout the communication and pause time periods, compared to the prior art described above. Therefore, the voltage regulator 126 can be designed to operate with very little excess headroom. Since the efficiency of the voltage regulator 126 depends on the ratio of its voltage output to its voltage input, this efficiency can be maximized by minimizing the difference between the average rectified voltage levels during the communication and pause time periods, thereby minimizing any excess headroom of the voltage regulator 126 during any portion of its operation. Consequently, the efficiency of the power pick-up unit 120 and of the overall power receiving device 111 is improved by some embodiments of the present invention over that of the prior art described above.

Two examples of circuitry 140 and 141 that are acceptable for performing the modulation with the secondary inductor coil 113, the rectification circuit 125 and the modulator 127 are shown in FIGS. 5 and 6, respectively. The example circuitries 140 and 141 are shown for illustrative purposes only and are not necessarily intended to limit the scope of the present invention. Instead, other circuitries for performing the modulation are also within the scope of the present invention. Additionally, the present invention is not limited to the exact components or connection schemes shown in FIGS. 5 and 6.

The example circuitry 140 of FIG. 5 generally includes the secondary inductor coil 113, a rectifier 142 (i.e. diodes 143-146 or appropriately configured transistors), a resonant capacitor 147, a filter capacitor 148, a modulation resistor 149 and a modulation transistor (or switch) 150. The resonant capacitor 147 and the secondary inductor coil 113 generally make up the resonant circuit for generating the AC current and voltage when the secondary inductor coil 113 is in the presence of the electromagnetic field generated by the power transmitter 110. The rectifier 142 rectifies the AC current and voltage into a DC current and voltage. The filter capacitor 148 performs an initial filtering to partially smooth out the rectified voltage, which still ripples at about the frequency of the electromagnetic field. The modulation transistor 150 receives the modulation signal (e.g. on line 139, see also FIG. 4) from the communication and control unit 121 and, in response, connects and disconnects the modulation resistor 149 to and from the rectifier 142, thereby changing or modulating the load. The changing load alters the level of the rectified voltage and the resonant frequency of the electromagnetically coupled primary and secondary inductor coils 112 and 113. The change in the resonant frequency alters the electromagnetic field, which changes the voltages or currents in the power transmitter 110. When the modulation is performed at the communication frequency, the sensors 119 detect the changes in the voltages or currents in the power transmitter 110 as the intended logic bits. On the other hand, when the modulation is performed at the more rapid frequency during the pause time periods, the sensors 119 cannot detect the changes in the voltages or currents in the power transmitter 110.

The example circuitry 141 of FIG. 6 generally includes the secondary inductor coil 113, a rectifier 151 (i.e. diodes 152-155 or appropriately configured transistors), a resonant capacitor 156, a filter capacitor 157, a modulation capacitors 158 and 159 and modulation transistors (or switches) 160 and 161. The resonant capacitor 156 and the secondary inductor coil 113 generally make up the resonant circuit for generating the AC current and voltage when the secondary inductor coil 113 is in the presence of the electromagnetic field generated by the power transmitter 110. The rectifier 151 rectifies the AC current and voltage into a DC current and voltage. The filter capacitor 157 performs an initial filtering to partially smooth out the rectified voltage, which still ripples at about the frequency of the electromagnetic field. The modulation transistors 160 and 161 receive the modulation signal (e.g. on line 139, see also FIG. 4) from the communication and control unit 121 and, in response, connects and disconnects the modulation capacitors 158 and 159 to and from the secondary inductor coil 113 (between the secondary inductor coil 113 and the rectifier 151), thereby changing or modulating the load. The changing load alters the level of the rectified voltage and the resonant frequency of the electromagnetically coupled primary and secondary inductor coils 112 and 113. (When the modulation capacitors 158 and 159 are coupled to the secondary inductor coil 113, the system resonant frequency is usually lower compared to the case when the modulation capacitors 158 and 159 are decoupled.) The change in the resonant frequency alters the electromagnetic field, which changes the voltages or currents in the power transmitter 110. When the modulation is performed at the communication frequency, the sensors 119 detect the changes in the voltages or currents in the power transmitter 110 as the intended logic bits. On the other hand, when the modulation is performed at the more rapid frequency during the pause time periods, the sensors 119 cannot detect the changes in the voltages or currents in the power transmitter 110.

Figure 7:
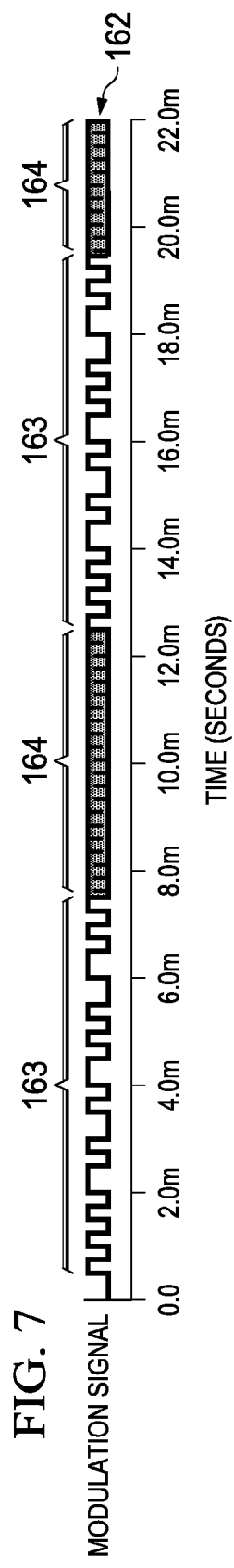
FIG. 7 is a simplified graph of a modulation signal for use in a wireless power receiving device according to an embodiment of the present invention.
Figure 8:
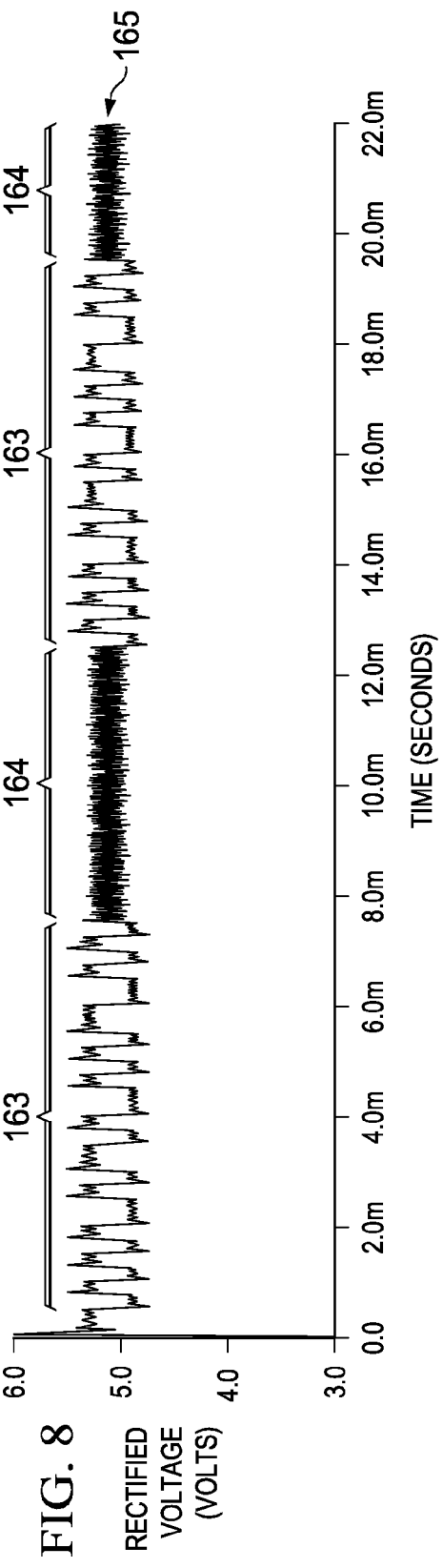
FIG. 8 is a simplified graph of an example rectified voltage resulting from the modulation signal shown in FIG. 7 according to an embodiment of the present invention.

FIGS. 7, 8 and 9 show graphs generated via a simulation of a circuit incorporating an embodiment of the present invention. Graph 162 of FIG. 7 is a simplified graph of an example modulation signal that may be produced by the communication and control unit 121 on line 139 (FIGS. 4, 5 and 6). The modulation signal graph 162 generally includes two communication time periods 163 and two pause time periods 164.

The relative lengths shown for the communication and pause time periods 163 and 164 and the time scale (x-axis) are for illustrative purposes only and are not intended to limit the scope of the present invention. Other lengths for the communication and pause time periods 163 and 164 and other time scales are within the scope of the present invention. WPC-compliant wireless power transmission systems or systems in accordance with the bq500110 data sheet or the bq51010, bq51011 and bq51013 data sheet (mentioned above), for example, may transmit communication packets from the power receiving device 111 to the power transmitter 110 every 250 ms during relatively steady state operating conditions, but if a large transient occurs, the feedback to the power transmitter 110 may speed up to every 30-32 ms in order to converge on an operating point in less time.

During the communication time periods 163, the modulation signal graph 162 alternates between high and low values that represent a differential bi-phase encoded bit stream similar to the prior art example described above with reference to FIG. 1. (The logic bits represented by the communication portions of the modulation signal graph 162 are not intended to correspond to any particular command or data that the power receiving device 111 might send to the power transmitter 110.) During the pause time periods 164, on the other hand, the modulation signal graph 162 alternates much more rapidly between the high and low values than it does during the communication time periods 163.

Graph 165 of FIG. 8 is a simplified graph of an example rectified voltage (e.g. on line 131, FIG. 4) as might be produced by the rectification circuit 125 resulting from modulation by the modulator 127 as activated by the modulation signal (graph 162) shown in FIG. 7. The rectified voltage graph 165 generally shows the two communication time periods 163 and the two pause time periods 164 corresponding to those shown in FIG. 7. During the communication time periods 163, the rectified voltage level is modulated between high and low levels according to the modulation signal (graph 162). In general, when the modulation component (e.g. the modulation resistor 149 of FIG. 5 or the modulation capacitors 158 and 159 of FIG. 6) is activated, the rectified voltage is at the low level; and when the modulation component is deactivated, the rectified voltage is at the high level. In this embodiment, during the pause time periods 164, the rectified voltage level is modulated between the high and low levels at such a rapid rate that the rectified voltage doesn't always have time to reach these levels before being driven back in the opposite direction. Thus, during the pause time periods 164, the rectified voltage level may be said to change within some range between the high and low levels in some embodiments.

Figure 2:
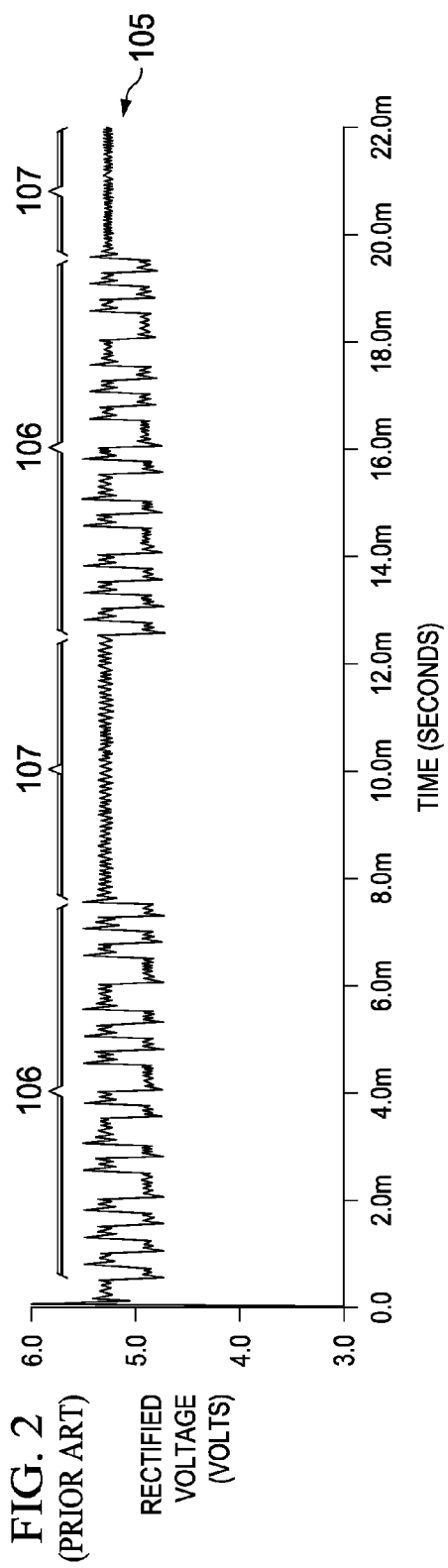
FIG. 2 is a simplified prior art graph of an example rectified voltage resulting from the modulation signal shown in FIG. 1.

The rectified voltage graph 165 may be compared to the prior art rectified voltage graph 105 of FIG. 2. Both graphs 105 and 165 are drawn at approximately the same vertical and horizontal scales. Whereas the prior art rectified voltage graph 105 remains at the high level during the pause time periods 107, the rectified voltage graph 165 fluctuates around approximately a midpoint between the high and low levels.

Figure 3:
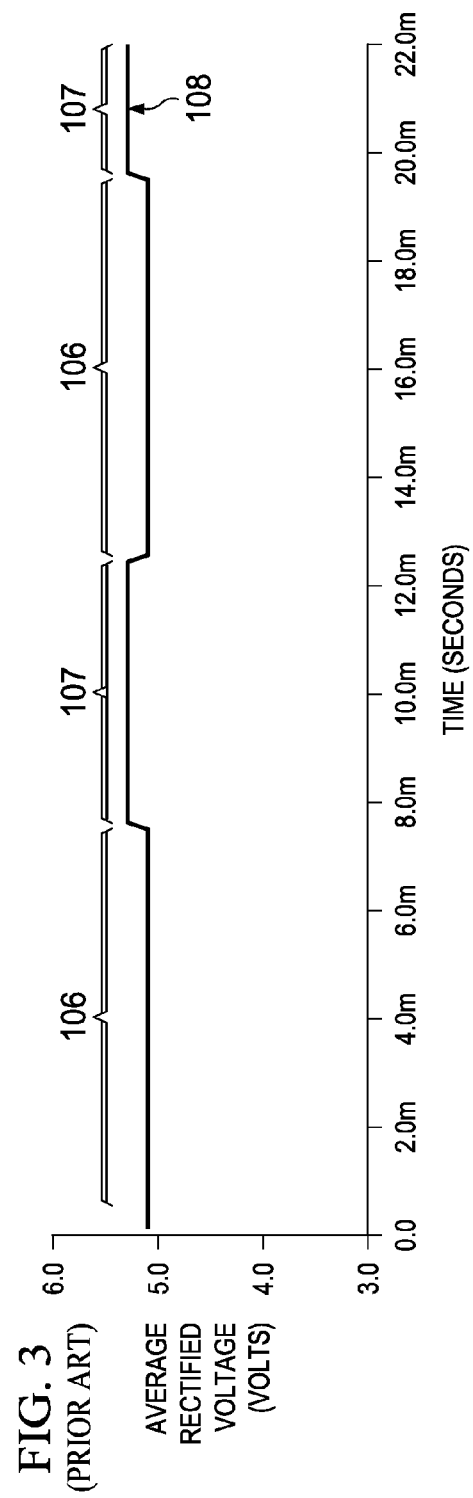
FIG. 3 is a simplified prior art graph of an average of the rectified voltage shown in FIG. 2.

Graph 166 of FIG. 9 is a simplified graph of an approximate average of the rectified voltage shown in FIG. 8 for each of the communication and pause time periods 163 and 164. The average rectified voltage graph 166 may be compared to the prior art average rectified voltage graph 108 of FIG. 3. Both graphs 108 and 166 are drawn at approximately the same vertical and horizontal scales. The difference between the average rectified voltage of the communication time periods 163 and the average rectified voltage of the pause time periods 164 of graph 166 in FIG. 9 is significantly smaller than the difference between the prior art average rectified voltage levels of the communication and pause time periods 106 and 107 of the graph 108 in FIG. 3. In fact, in order to adequately see the difference between the average rectified voltage of the communication and pause time periods 163 and 164 of graph 166, the vertical scale must be made much finer, as shown in FIG. 10. Since the difference between the average rectified voltage of the communication and pause time periods 163 and 164 is reduced, the periodically occurring output voltage ripple mentioned above in the background is also reduced.

One of the problems in the prior art described above was that filtering capacitor(s) (e.g. corresponding to filtering capacitors 148 and 157 of FIGS. 5 and 6) had to be relatively large to properly handle the wide variation in the average rectified voltage level (e.g. graph 108, FIG. 3) over the relatively long time duration of a cycle of any two consecutive communication and pause time periods 106 and 107. However, according to some embodiments of the present invention, since the difference between the average rectified voltage of the communication and pause time periods 163 and 164 of graph 166 is significantly smaller than that of the prior art, the filtering capacitors 148 and 157 of FIGS. 5 and 6 can be significantly smaller, and thus cheaper, than those of the prior art.

Another one of the problems in the prior art described above was that a post-rectification voltage regulator had to operate under a relatively high headroom during time periods (e.g. the pause time periods 107 of FIG. 3) when the average rectified voltage level was at its higher levels, and the higher headroom negatively impacted the efficiency of the voltage regulator. However, according to some embodiments of the present invention, since the difference between the average rectified voltage of the communication and pause time periods 163 and 164 of graph 166 is significantly smaller than that of the prior art, the headroom under which the voltage regulator 126 (FIG. 4) operates during the pause time periods 164 is significantly closer to the headroom under which the voltage regulator 126 operates during the communication time periods 163. Thus, efficiency of the voltage regulator 126 is not significantly sacrificed, compared to the prior art.

Additional embodiments may bring the averages of the rectified voltage during the communication and pause time periods 163 and 164 even closer together than described above. By selecting or adjusting the duty cycle of the modulation signal during the pause time periods, the voltage level of the average rectified voltage during the pause time periods can be set to a desired level.

The duty cycle of the modulation signal 162 during the pause time periods 164 for the example embodiment shown in FIGS. 7-10 is 50%. The prior art example of FIGS. 1, 2 and 3 generally represents a case having a duty cycle of 0%.

The differential bi-phase encoding scheme used for the modulation signal 162 during the communication time periods 163 is generally intended to result in the average voltage level of the rectified voltage 165 during these times being at about a midpoint between the high and low states thereof. Similarly, the 50% duty cycle during the pause time periods 164 generally results in the average voltage level of the rectified voltage 165 being at about a midpoint between the high and low points during these time periods. However, since the rectified voltage 165 is preferably modulated relatively rapidly during the pause time periods 164, the rectified voltage 165 doesn't have time to reach the same high and low states that it does during the communication time periods 163. Additionally, circuit characteristics may skew the high and low points of the rectified voltage 165 during the pause time periods 164 either up or down relative to the high and low states during the communication time periods 163. As a result, the average rectified voltage 166 (FIGS. 9 and 10) is similarly skewed during the pause time periods 164.

The 50% duty cycle example embodiment results in the average rectified voltage 166 during the pause time periods 164 being much closer to the average rectified voltage 166 during the communication time periods 163 than in the prior art 0% duty cycle example. However, since the average rectified voltage 166 during the pause time periods 164 is still higher than the average rectified voltage 166 during the communication time periods 163, a duty cycle slightly greater than 50% should bring the averages even closer together.

Figure 1:
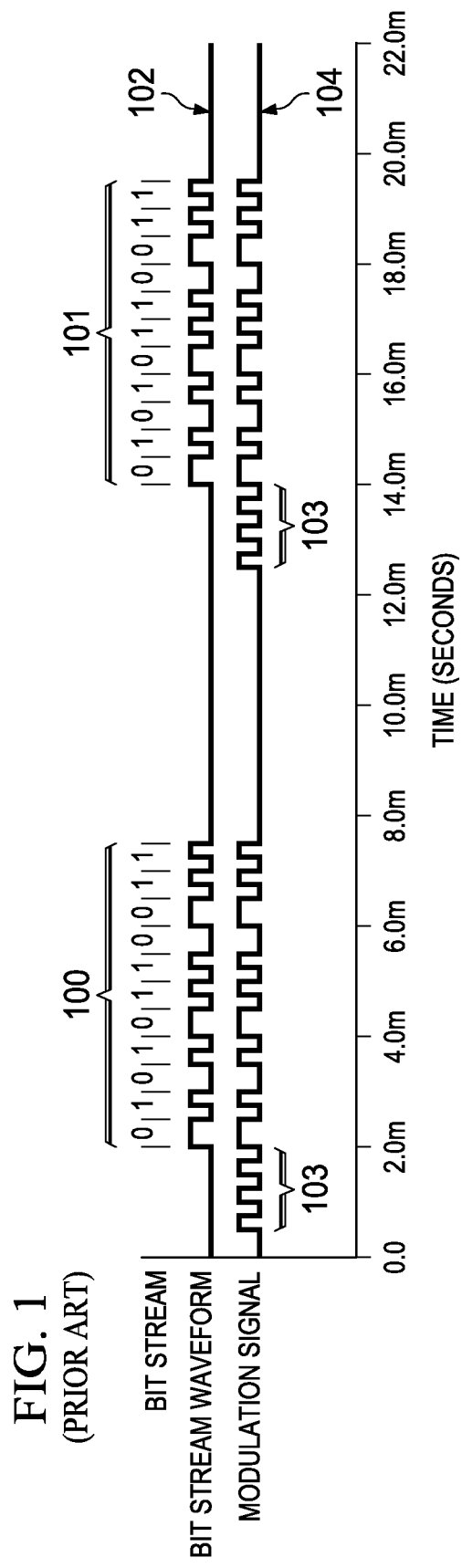
FIG. 1 is a simplified set of prior art graphs for a bit stream waveform and a modulation signal for use in a prior art wireless power receiver.

FIG. 11 shows a rectified voltage graph 167 generated in a simulation in which the modulation signal (not shown) during communication time periods 168 encodes the same bit stream as the modulation signals 104 and 162 of FIGS. 1 and 7. However, during pause time periods 169, the modulation signal fluctuates at about the same frequency at which the modulation signal 162 fluctuates, but with about a 60% duty cycle instead of a 50% duty cycle. As a result, the rectified voltage 167 within the communication time periods 168 is about the same as the rectified voltage 165 of FIG. 8. During the pause time periods 169, on the other hand, the rectified voltage 167 is slightly lower than the rectified voltage 165 of FIG. 8. The difference is barely noticeable at the scale of FIGS. 8 and 11. However, FIG. 12 shows an average rectified voltage graph 170 for the rectified voltage 167 at about the same finer vertical scale as for the average rectified voltage 166 of FIG. 10. At this scale, it can be seen that the average rectified voltage graph 170 during the pause time periods 169 is closer to the average rectified voltage graph 170 during the communication time periods 168 than is the case for the 50% duty cycle example of FIG. 10.

Other embodiments may set or adjust the duty cycle of the modulation signal to any appropriate value to bring the average rectified voltage during the pause time periods close to the average rectified voltage during the communication time periods, thereby minimizing the difference between these averages. The above described advantages of the present invention may, thus, be enhanced with this technique. The headroom that the voltage regulator 126 must operate under, for example, may be minimized, thereby potentially maximizing the efficiency of the voltage regulator 126.

Presently preferred embodiments of the present invention and its improvements have been described with a degree of particularity. This description has been made by way of preferred example. It should be understood, however, that the scope of the claimed subject matter is defined by the following claims, and should not be unnecessarily limited by the detailed description of the preferred embodiments set forth above.

The invention claimed is:

1. An electronic device comprising:
a power pick-up unit that receives electrical power wirelessly via an electromagnetic field generated by a power transmitter;
a modulator that causes the electromagnetic field to change between first and second states by one of amplitude modulation, frequency modulation or phase modulation, in a first manner that can be detected by the power transmitter as logic bits in a communication bit stream for sending data to the power transmitter during communication time periods, the modulator causes the electromagnetic field to change between the first and second states in a second manner that is not detected by the power transmitter as the logic bits during pause time periods when data is not being sent to the power transmitter,
wherein:
the power pick-up unit comprises a rectifier;
the rectifier converts an AC current, generated by the electromagnetic field, into a DC current with a voltage that ripples around a rectified voltage level;
during the communication time periods, the modulator causes the rectified voltage level to change between first and second voltage levels representative of the logic bits; and
during the pause time periods, the modulator causes the rectified voltage level to change within a range between the first and second voltage levels with a duty cycle selected to minimize a difference between an average level of the voltage output by the rectifier during the pause time periods and an average level of the voltage output by the rectifier during the communication time periods.

2. The electronic device of claim 1, wherein:
the power pick-up unit comprises a rectifier and a voltage conditioner;
the rectifier converts an AC current, generated by the electromagnetic field, into a DC current with a rectified voltage;
the voltage conditioner regulates the rectified voltage to a substantially stable output voltage;
the voltage conditioner operates with an efficiency that depends on an amount of headroom between the rectified voltage and the output voltage;
during the communication time periods, the modulator causes the rectified voltage level to change in a manner representative of the logic bits; and
during the pause time periods, the modulator causes the rectified voltage level to change in a manner that minimizes the headroom.

3. The electronic device of claim 1, wherein:
the power pick-up unit further comprises a voltage conditioner;
the voltage conditioner regulates the voltage from the rectifier to a substantially stable level;
the voltage conditioner operates with an efficiency that depends on an amount of headroom between an input voltage level and an output voltage level thereof; and
the duty cycle during the pause time periods is selected to minimize the headroom.

4. The electronic device of claim 1, wherein:
during the pause time periods, the modulator changes the electromagnetic field between the first and second states too rapidly for the power transmitter to detect the electromagnetic field changes as the logic bits.

5. The electronic device of claim 1, wherein:
during the communication time periods, the modulator changes the electromagnetic field between the first and second states at a first frequency at which the logic bits are transmitted; and
during the pause time periods, the modulator changes the electromagnetic field between the first and second states at a second frequency that is higher than the first frequency.

6. The electronic device of claim 5, wherein:
the second frequency is at least five times greater than the first frequency.

7. The electronic device of claim 5, wherein:
the electromagnetic field has a base frequency; and
the second frequency is at least five times less than the base frequency.

8. An electronic device comprising:
a means for wirelessly receiving electrical power by electromagnetic field coupling;
a means for converting the received electrical power into a DC current with a DC voltage;
a means for regulating the converted DC voltage to a substantially constant output voltage;
a means for modulating at a first frequency the converted DC voltage to first and second voltage levels to alter the coupling electromagnetic field in a manner that a means for wirelessly transmitting the electrical power can detect as communication logic bits during communication time periods, the first and second voltage levels of the converted DC voltage being representative of the communication logic bits, and the modulating at the first frequency resulting in an average converted DC voltage for the communication time periods; and
a means for modulating at a second frequency the converted DC voltage between the first and second voltage levels to alter the coupling electromagnetic field in a manner that the means for wirelessly transmitting the electrical power does not detect as communication logic bits during pause time periods, the second frequency being too high for the means for wirelessly transmitting the electrical power to detect the alterations of the coupling electromagnetic field as communication logic bits, and the modulating at the second frequency resulting in an average converted DC voltage for the pause time periods being substantially similar to the average converted DC voltage for the communication time periods to maximize an efficiency of the means for regulating.

9. The electronic device of claim 8, wherein:
the second frequency is at least five times greater than the first frequency.

10. The electronic device of claim 8, wherein:
the means for regulating operates with an efficiency that depends on an amount of headroom between an input voltage level and an output voltage level thereof; and
a duty cycle of the second frequency during the pause time periods is selected to minimize the headroom.

11. A method comprising:
a wireless power receiver wirelessly receiving electrical power via electromagnetic field coupling from a wireless power transmitter;
during communication time periods, the wireless power receiver altering the electromagnetic field by one of amplitude modulation, frequency modulation or phase modulation in a manner that the wireless power transmitter can detect as a string of logic bits; and
during pause time periods, the wireless power receiver altering the electromagnetic field by one of amplitude modulation, frequency modulation or phase modulation in a manner that the wireless power transmitter does not detect as a string of logic bits; further comprising:
the wireless power receiver rectifying the received power to a DC current with a rectified voltage;
during the communication time periods, the wireless power receiver modulating the rectified voltage to first and second voltage levels representative of the logic bits; and
during the pause time periods, the wireless power receiver modulating the rectified voltage within the range between the first and second voltage levels resulting in an average rectified voltage level for the pause time periods that is similar to the average rectified voltage level for the communication time periods.

12. The method of claim 11 further comprising:
the wireless power receiver regulating the rectified voltage to a substantially constant output voltage level; and
during the pause time periods, the wireless power receiver modulating the rectified voltage between the first and second voltage levels to maximize an efficiency of the regulating of the rectified voltage.

13. The method of claim 12, further comprising:
during the pause time periods, the wireless power receiver modulating the rectified voltage between the first and second voltage levels with a duty cycle selected to maximize the efficiency of the regulating of the rectified voltage.

14. The method of claim 11, further comprising:
during the pause time periods, the wireless power receiver altering the electromagnetic field too rapidly for the wireless power transmitter to detect the alterations as a string of logic bits.

15. The method of claim 11, further comprising:
during the communication time periods, the wireless power receiver altering the electromagnetic field at a first frequency that is within a communication frequency band;
during the pause time periods, the wireless power receiver altering the electromagnetic field at a second frequency that is outside the communication frequency band.

16. The method of claim 15, wherein:
the second frequency is at least five times greater than the first frequency.

17. The method of claim 15, wherein:
the electromagnetic field has a base frequency; and
the second frequency is at least five times less than the base frequency.

* * * * *